Dec. 18, 1956   F. H. SHEPARD, JR   2,774,245
INTERMITTENT MOTION DEVICE
Filed Jan. 22, 1953   2 Sheets-Sheet 1
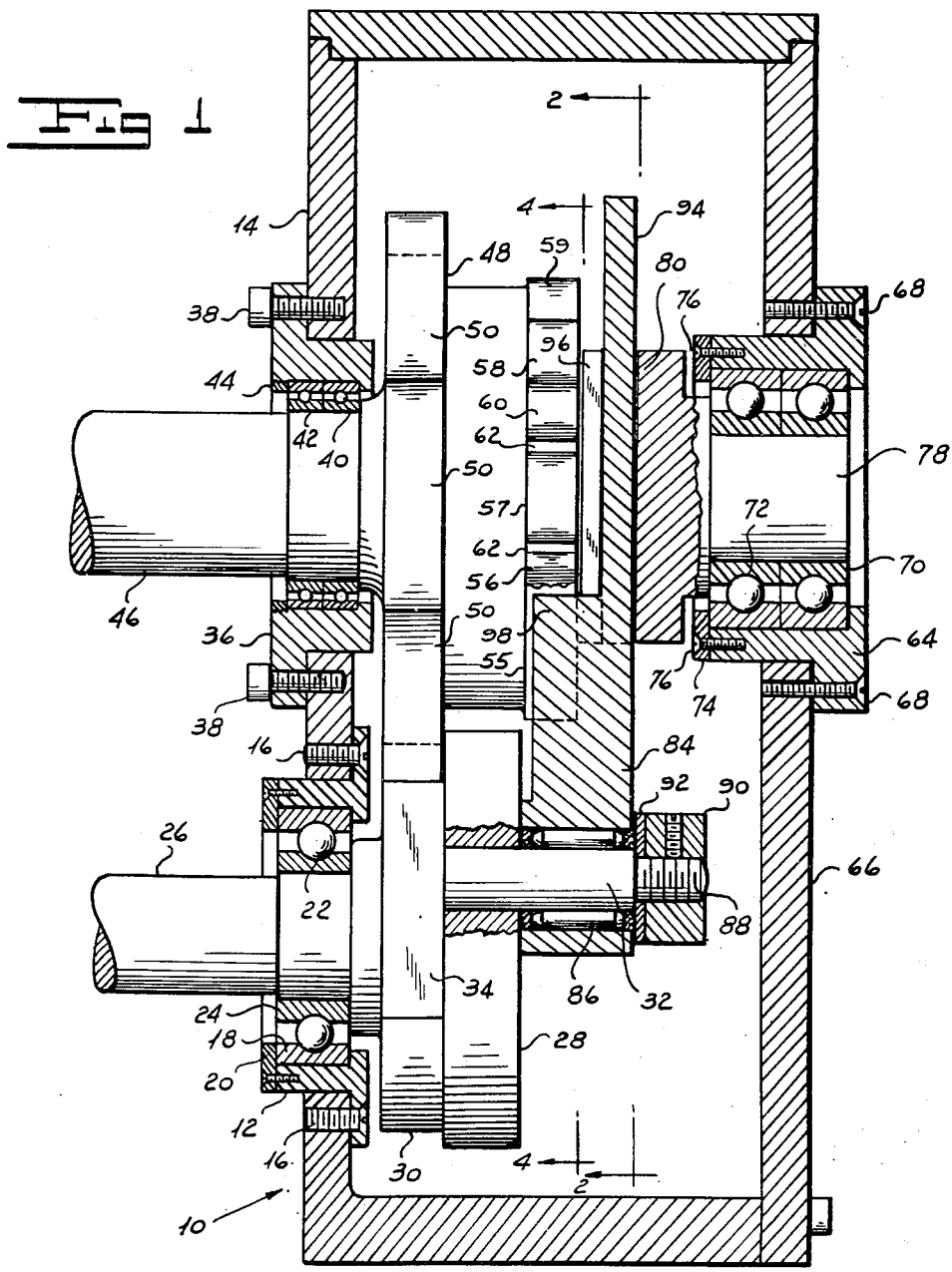
INVENTOR.
FRANCIS H. SHEPARD JR.
BY Henry L. Shenier
ATTORNEY Dec. 18, 1956  F. H. SHEPARD, JR  2,774,245
INTERMITTENT MOTION DEVICE
Filed Jan. 22, 1953  2 Sheets-Sheet 2
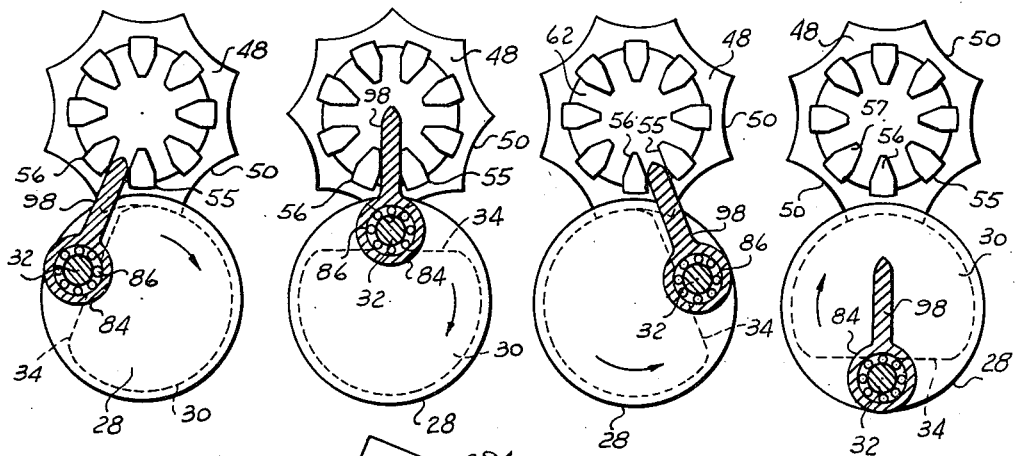
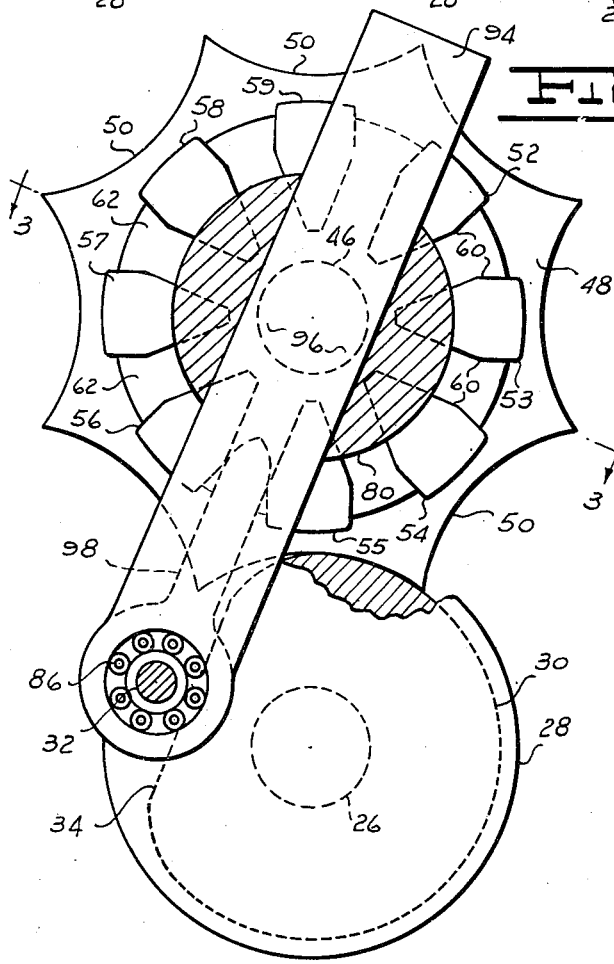
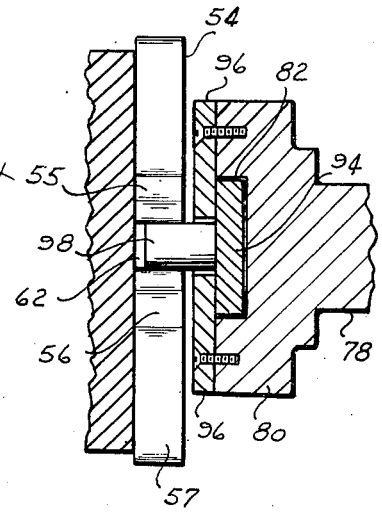
INVENTOR.
FRANCIS H. SHEPARD JR.
BY Harry L. Shenier
ATTORNEY

United States Patent Office 2,774,245
Patented Dec. 18, 1956

2,774,245

INTERMITTENT MOTION DEVICE

Francis H. Shepard, Jr., Madison, N. J.

Application January 22, 1953, Serial No. 332,712

9 Claims. (Cl. 74—84)

My invention relates to an improved intermittent motion device and more particularly to an improved device for obtaining intermittent rotary motion of one shaft from continuous rotary motion of another shaft which is adapted to generate a high-velocity output in which greatly increased acceleration of the speed of rotation of the output shaft during its movement is efficiently and smoothly achieved.

An intermittent motion device is a mechanism for obtaining a dwell or a series of dwells in the motion of an output shaft from a continuously rotating input shaft. In the prior art when it was desired to transmit motion to another shaft only at predetermined intervals from a continuously rotating shaft, intermittent gearing was sometimes used. In many applications, an intermittent motion device known as the Geneva wheel was employed. Intermittent motions have also been obtained in the prior art by the use of cams in connection with differential gear arrangements. In some constructions of the prior art, a ratchet has been employed to obtain intermittent motion. Many designs of intermittent motions are known to the art because they are required on a great variety of different types of automatic and semiautomatic machines. Many of the intermittent motion devices of the prior art are complicated mechanisms, expensive to construct and difficult to maintain. In all of the intermittent gear and Geneva-type motion devices of the prior art of which I am aware, the force from the driving shaft is transmitted to the driven shaft through thrust areas comprising substantially only line contact. Since engagements are usually sudden, acceleration forces are large.

One object of my invention is to provide an improved, novel intermittent motion device.

Another object of my invention is to provide an improved intermittent motion device in which large forces can be transmitted by a comparatively small mechanism.

Another object of my invention is to provide an improved high-speed intermittent motion device.

A further object of my invention is to provide an improved intermittent motion in which the output shaft can be accelerated quickly to a high velocity.

Another object of my invention is to provide an improved intermittent motion in which the thrust is transmitted through a large contact area during the period of maximum acceleration in both the positive and negative directions.

Another object of my invention is to provide an intermittent motion in which there is substantially no shock during the engagement and disengagement of the parts.

Other and further objects of my invention will appear from the following description.

In the accompanying drawings which form part of the instant specification and which are to be read in conjunction therewith and in which like reference numerals are used to indicate like parts in the various views:

Figure 1 is a sectional elevation of an improved intermittent motion showing one embodiment of my invention.

Figure 2 is a sectional view taken along the line 2—2 of Figure 1.

Figure 3 is a fragmentary sectional view taken along the line 3—3 of Figure 2.

Figure 4 is a sectional view drawn on a reduced scale taken along the line 4—4 of Figure 1 showing the position of parts near the beginning of the intermittent motion of the driven shaft.

Figure 5 is a view similar to Figure 4 showing the position of parts at the point of maximum velocity of the driven shaft.

Figure 6 is a view similar to Figure 4 showing the position of parts near the end of an intermittent motion step.

Figure 7 is a view similar to Figure 4 showing the position of parts during the period of dwell of the driven shaft.

Referring now to the drawings, the intermittent motion parts are positioned within a housing indicated generally by the reference numeral 10 of any appropriate construction. A bearing support member 12 is mounted in an appropriate aperture formed in the wall 14 of the housing 10. The bearing support member 12 is secured to the housing wall 14 by means of screws 16. The outer race 18 of a ball bearing is positioned within the bearing support member 12 and maintained in position by a keeper plate 20. Suitable balls 22 rotatably support an inner race 24 which carries the end of the input or drive shaft 26. The drive shaft is adapted to be driven from any appropriate means (not shown) in any suitable manner. Formed integral with the drive shaft or formed separate therefrom and secured thereto in any appropriate manner for rotation therewith, I provide a circular crank plate 28 and a circular locking plate 30. The crank plate carries a crankpin 32. Adjacent the edge of the crank plate, the locking plate 30 is formed with a cut-away portion to provide a surface 34 symmetrical with the axis of the crankpin 32 and extending normal to a radius drawn through the axis of rotation of the locking plate 30. It will be observed that the axis of rotation of the crank plate 28 and the locking plate 30 lies along the axis of rotation of the driven shaft 26.

Within an appropriate aperture, I mount a second bearing support ring 36 which I secure to the wall 14 of the housing 10 by means of screws 38. A pair of roller- or ball-bearing assemblies 40 and 42 are supported by the bearing support ring 36 and maintained in position by a threaded bearing locking ring 44. The output shaft 46 is rotatably supported by the bearings 40 and 42. It will be observed that the output shaft is heavier and of larger diameter than the input shaft since it must take the stresses incident to being rapidly accelerated and decelerated from and to a position of rest and carry the load being driven during this acceleration and deceleration. Formed integrally with the output shaft 46 or secured thereto for rotation therewith in any appropriate manner, I provide a wheel 48, the periphery of which is formed with a plurality of inverted scallops 50. The curvature of the surface of each scallop 50 corresponds to the curvature of the periphery of the locking plate 30. The inverted scallap wheel 48 carries a plurality of teeth 52, 53, 54, 55, 56, 57, 58 and 59, there being one tooth for each inverted scallop. The sides 60 of the teeth extend along parallel plane surfaces from their axial ends outwardly to a point somewhat short of their outer edges. The spaces 62 between the teeth are adapted to guide an elongated motion transmitting tooth, as will be hereinafter more fully pointed out.

A third bearing support ring 64 is positioned in a suitable aperture formed in the wall 66 of the housing 10 and is secured thereto by means of screws 68. The bearing support ring carries a pair of ball-bearing assemblies 70 and 72. A keeper ring 74 secured to the bearing support ring 64 by screws 76 maintains the ball bearings in position. A stub shaft 78 is rotatably mounted in the bearings 70 and 72 and carries a member 80 formed with a guide slot 82 as can readily be seen by reference to Figure 3. The shaft 78 is mounted coaxially with the shaft 46. The guide slot 82 is disposed symmetrically about the axis of shaft 78. In this manner the axis of rotation of the guide slot 82 will be coaxial with the axis of rotation of the inverted scallop wheel 48. The lower end of a member 84 is rotatably carried by the crankpin 32 through roller bearings 86. The outer end of the crankpin 32 is formed with a threaded portion 88 adapted to receive a nut 90 for securing the lower end of the member 84 to the crankpin. A washer 92 is advantageously positioned between the nut 90 and the outer surface of the member 84. The member 84 is formed with an elongated guide plate 94, which is positioned in the guide slot 82, as can readily be seen by reference to Figure 3. A pair of keepers 96 are secured to the member 80 for maintaining the guide plate 94 in the guide slot 82. An elongated tooth 98 is formed integral with and is part of the member 84. The guide plate 94, it will be seen, performs the function of maintaining the member 84 and hence the elongated tooth 98 extending along a radius passing through the axis of rotation of the output shaft 46.

Referring now to Figure 2, it will be seen that the axes of teeth 52, 53, 54, 55, 56, 47, 58 and 59 extend along radii passing through the axis of rotation of the output shaft 46. The plane surfaces 60, forming portions of the sides of the teeth, form passageways. The axis of each of the passageways lies along a radius drawn through the axis of rotation of the output shaft 46. The width of each passageway 62 is equal to the thickness of the elongated motion transmitting tooth 98, as can readily be seen by reference to Figure 3.

In operation let us assume that the input shaft 26 is being driven to rotate the cam plate 28 in a clockwise direction as viewed in Figure 4. Let us assume that the parts are in a position shown in Figure 7, that is, with a locking plate 30 in engagement with one of the inverted scallops 50. In this position, the output shaft 46 is immobilized, being locked by the interengagement of the periphery of an inverted scallop with the periphery of the locking plate 30. The locking plate, however, is free to rotate and to carry the crank plate and crankpin 32 around with it. As the crankpin rotates, the guide plate 94 will reciprocate in its guideway 82 and maintain the elongated motion transmitting tooth 98 constantly oriented along a line passing through the center of rotation of the inverse scalloped wheel 48. As the rotation continues, the parts will arrive in a position where the elongated tooth 98 will enter the passageway 62 between two teeth, say teeth 56 and 55. At the instant of entering the passageway, there will be a momentary line contact between the side of the tooth 98 and the tooth 56. At this instant the upper edge of the surface 34 just clears the left-hand edge of the inverted scallop through which the inverted scallop wheel was immobilized by coaction with the locking plate 30. This permits the output shaft to turn in a counterclockwise direction. The elongated tooth 98 continues to enter the passageway 62 between teeth 55 and 56 and at the same time carries the inverse scallop wheel around in counterclockwise direction. The velocity of this rotation will commence at a very slow rate since the sine of the angle which a line drawn from the axis of rotation of the crank plate 28 through the center of the crankpin 32 makes with the horizontal is small. Stated otherwise, the component of motion of the crankpin 32 in an upward direction will be large with respect to the component of motion of the rotation of the crankpin 82 in a horizontal direction. The speed of output motion is modified as well by the angle between the axis of the elongated tooth 98 and the vertical. It will be seen, therefore, if the engagement occurs when the crankpin is 90° with respect to the axis of the tooth 98, that at the instant line contact exists, the velocity of rotation of the driven shaft will be zero. As the velocity of motion increases, the contact between the sides of the elongated tooth 98 and the coacting teeth 56 and 55 will progressively increase. The maximum velocity will occur with the parts in the position shown in Figure 5. The increase in velocity, of course, is brought about by a smooth rise in acceleration. After the parts have reached the position shown in Figure 5, the velocity will progressively drop smoothly and there will be smooth deceleration in moving the parts from the position shown in Figure 5 to the position shown in Figure 6, in which position the intermittent motion cycle is about to be brought to a close. At the instant the elongated tooth 98 withdraws from between teeth 55 and 56, tooth 57 will have been moved to a position so that the passageway 62 between teeth 57 and 56 will be ready for the next stroke or increment of intermittent rotary motion and ready to receive the elongated tooth 98. At this instant what is now the upper edge of the surface 34 will move by the end of the inverted scallop 50 so that the periphery of the locking plate 30 will hold the output shaft in demobilized condition forcing it to dwell until the next stroke.

While, for purposes of illustration and not by way of limitation, I have shown the intermittent motion with an increment of 45° for each 360° rotation of the crankpin 32, it will readily be understood by those skilled in the art that the intermittent motion step may be any convenient factor of 360°. Stated differently, I may employ either more or fewer teeth than eight, together with a corresponding number of inverted scallops.

Substantially all shock is avoided by positioning the parts so that there is no rotational thrust being transmitted at the instant of engagement of the elongated tooth 98 in a passageway 62.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. In an intermittent motion device, a driving shaft, a driven shaft, means for mounting the shafts for rotation adjacent to each other, an inverted scallop wheel carried by the driven shaft for rotation therewith, a locking member formed with a circular periphery having a cutaway portion carried by the driving shaft for rotation therewith, the curvature of the periphery of the locking member corresponding to the curvature of each inverted scallop, a crankpin, means for mounting the crankpin on the driving shaft for rotation therewith, a driving member formed with a plurality of radially extending passageways carried by the driven shaft for rotation therewith, an elongated tooth having one end thereof rotatably carried by the crankpin and separate means for continuously orienting the axis of the elongated tooth to extend radially through the axis of rotation of said driving member.

2. An intermittent motion device as in claim 1 in which said driving member is carried by said inverted scallop wheel.

3. An intermittent motion device as in claim 1 in which said passageways are formed by a plurality of radially extending teeth spaced from each other carried by said inverted scallop wheel.

4. An intermittent motion device as in claim 1 in which said crankpin is carried by a crank plate formed integrally with said locking member.

5. An intermittent motion device as in claim 1 in which said elongated tooth is of such length that it will engage the sides of one of said passageways at a time at which the component of motion of said crankpin in a horizontal direction is small, whereby to minimize the shock of engagement between the elongated tooth and the sides of one of said passageways.

6. An intermittent motion device as in claim 1 in which the cutaway portion of said locking member provides a surface symmetrical with a plane passing through the axis of rotation of said driving shaft and the axis of said crankpin.

7. An intermittent motion device as in claim 1 in which said means for orienting the axis of the elongated tooth comprises a third shaft, means for mounting the third shaft for rotation coaxial with an axis of rotation of said driven member, a guide member carried by said elongated tooth and having its axis extending through the axis of said crankpin, a guideway carried by said third shaft and extending diametrically of the axis of rotation of said third shaft and said driving member, said guide member being positioned in said guideway and being of sufficient length to remain lodged therein during a complete cycle of rotation of said crankpin.

8. In an intermittent motion device, a driving shaft, a driven shaft, means for mounting the shafts for rotation adjacent each other, a crankpin, means for mounting the crankpin on the driving shaft for rotation therewith, a driving member formed with a plurality of radially extending passageways carried by the driven shaft for rotation therewith, an elongated tooth having one end thereof rotatably carried by the crankpin, separate means for continuously orienting the axis of the elongated tooth to extend radially through the axis of rotation of the driving member and means for immobilizing the driving member when said elongated tooth is out of engagement with a radially extending passageway.

9. In an intermittent motion device, a driving shaft, a driven shaft, means for normally immobilizing the driven shaft, means for mounting the shafts for rotation adjacent each other, a crankpin, means for mounting the crankpin on the driving shaft for rotation therewith, a driving member formed with a plurality of radially extending passageways carried by the driven shaft for rotation therewith, an elongated tooth having one end thereof rotatably carried by the crankpin, separate means for continuously orienting the axis of the elongated tooth to extend radially through the axis of rotation of the driving member and means for freeing said immobilizing means for the driven shaft when said elongated tooth engages a radially extending passageway.

References Cited in the file of this patent

UNITED STATES PATENTS

| 1,480,864 | Reed | Jan. 15, 1924 |
| 1,530,178 | Higginson | Mar. 17, 1925 |
| 2,482,722 | Tarry | Sept. 20, 1949 |

FOREIGN PATENTS

| 337,709 | Germany | June 6, 1921 |
| 520,986 | Germany | Mar. 14, 1931 |